United States Patent
Komiyama et al.

(10) Patent No.: US 11,861,417 B2
(45) Date of Patent: Jan. 2, 2024

(54) OPERATION SUPPORT SYSTEM, OPERATION SUPPORT METHOD, AND OPERATION SUPPORT PROGRAM

(71) Applicant: Nippon Telegraph and Telephone Corporation, Tokyo (JP)

(72) Inventors: Makoto Komiyama, Musashino (JP); Takeshi Masuda, Musashino (JP); Akira Kataoka, Musashino (JP); Masashi Tadokoro, Musashino (JP); Hidetaka Koya, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/762,830

(22) PCT Filed: Oct. 9, 2019

(86) PCT No.: PCT/JP2019/039866
§ 371 (c)(1),
(2) Date: Mar. 23, 2022

(87) PCT Pub. No.: WO2021/070292
PCT Pub. Date: Apr. 15, 2021

(65) Prior Publication Data
US 2022/0342724 A1 Oct. 27, 2022

(51) Int. Cl.
G06F 3/00 (2006.01)
G06F 9/54 (2006.01)
H04L 51/02 (2022.01)

(52) U.S. Cl.
CPC ............... *G06F 9/54* (2013.01); *H04L 51/02* (2013.01)

(58) Field of Classification Search
CPC ............................................. G06F 9/54
(Continued)

(56) References Cited

U.S. PATENT DOCUMENTS

2006/0106611 A1* 5/2006 Krasikov ............... G09B 19/04
704/E17.002
2009/0307619 A1 12/2009 Gupta et al.
(Continued)

FOREIGN PATENT DOCUMENTS

CN 1659606 A * 8/2005
CN 108027887 A * 5/2018
(Continued)

OTHER PUBLICATIONS

James Fogarty, Case Studies in the use of ROC Curve Analysis for Sensor-Based Estimates in Human Computer Interaction. (Year: 2005).*

(Continued)

*Primary Examiner* — Lechi Truong
(74) *Attorney, Agent, or Firm* — Fish & Richardson P.C.

(57) ABSTRACT

A peripheral information acquisition unit (121) acquires information relating to a first application (13a) running in a terminal, information relating to control of the terminal, or information that can be acquired from a sensor included in the terminal, as peripheral information. The peripheral information acquired by the peripheral information acquisition unit (121) is accumulated in a peripheral information accumulation unit (122). A dialogue interface unit (11) accepts input of information from a user and outputs information to the user. When the peripheral information accumulated in the peripheral information accumulation unit (122) and information input to the dialogue interface unit (11) satisfy a predetermined condition, a scenario control unit (123) causes the dialogue interface unit (11) to output information relating to execution of a second application (14) that is associated with the condition in advance.

12 Claims, 12 Drawing Sheets

(58) Field of Classification Search
USPC .......................................................... 719/310
See application file for complete search history.

(56) References Cited

U.S. PATENT DOCUMENTS

| | | | | |
|---|---|---|---|---|
| 2010/0262613 A1* | 10/2010 | Gupta | ................... | G06F 16/283 |
| | | | | 707/755 |
| 2014/0053111 A1* | 2/2014 | Beckman | ................... | G06F 3/14 |
| | | | | 345/672 |
| 2019/0012390 A1* | 1/2019 | Nishant | ................... | G06N 3/006 |

FOREIGN PATENT DOCUMENTS

| | | | |
|---|---|---|---|
| CN | 105047195 B | * | 6/2019 |
| CN | 114630232 A | * | 6/2022 |
| JP | 2016539432 | | 12/2016 |

OTHER PUBLICATIONS

Harnani Hassan, Face Recognition Based on Auto-Switching Magnetic Door Lock System Using Microcontroller. (Year: 2012).*
Mobilus Corporation and Virtualex Consulting, Inc., "Demo release of 'RPA chatbot' that links RPA and chatbot. One-stop full automation from inquiry reception to content registration and answering," Press Release, Nov. 12, 2018, retrieved from URL <https://mobilus.co.jp/press-release/5426>, 9 pages (with English Translation).
NTT DoComo, Inc., "FAQ Chatbot," NTTDoCoMo.co, retrieved on Sep. 9, 2019, retrieved from URL nttdocomo.co.jp/biz/service/ai_agent_api/chatbot/>, 9 pages (with English Translation).
Storey et al., "Disrupting Developer Productivity One Bot at a Time," FSE '16, Nov. 13, 2016, pp. 928-931.

* cited by examiner

OPERATION SUPPORT SYSTEM, OPERATION SUPPORT METHOD, AND OPERATION SUPPORT PROGRAM

CROSS-REFERENCE TO RELATED APPLICATIONS

This application is a National Stage application under 35 U.S.C. § 371 of International Application No. PCT/JP2019/039866, having an International Filing Date of Oct. 9, 2019. The disclosure of the prior application is considered part of the disclosure of this application, and is incorporated in its entirety into this application.

TECHNICAL FIELD

The present invention relates to an operation assist system, an operation assist method, and an operation assist program.

BACKGROUND ART

Conventionally, there are dialogue programs called "chatbots" that automatically respond to text or voice input from a user. Chatbots automatically give a response to input from a user, following rules that are determined in advance. Thus, chatbots reduce manual response tasks performed in customer support work or the like and contribute to improvement of productivity and work reduction.

On the other hand, there are chatbots that are aimed at assisting a user to make operations in a terminal by operating other applications or passing data on to the other applications based on input to the chatbots, rather than merely making a simple response in text.

For example, there is a known technology that realizes automation of work such as management of the version number of source code mainly performed in software development, by inputting commands to a chatbot (see NPL 2, for example). Also, there is a known technology that realizes automation of a user operation by passing data that is input to a chatbot on to an RPA (Robotic Process Automation) tool to execute RPA (see NPL 3, for example).

CITATION LIST

Non Patent Literature

[NPL 1] FAQ chatbot (NTT Docomo), [online], [searched on Sep. 30, 2019], Internet (https://www.nttdocomo.co.jp/biz/service/ai_agent_api/chatbot/)
[NPL 2] Storey M and Zagalsky, "Disrupting Developer Productivity One Bot at a Time", 2016
[NPL 3] "RPA chatbot" cooperation between RPA and chatbot (Mobilus Corporation/Virtualex Consulting, Inc., 2018), [online], [searched on Sep. 30, 2019](https://mobilus.co.jp/press-release/5426)

SUMMARY OF THE INVENTION

Technical Problem

However, conventional technologies have a problem in that there are cases where it is difficult to reduce user operations when controlling an application using a dialogue interface. According to the conventional technologies, a user can operate an application by inputting text using a chat dialogue interface. On the other hand, the conventional technologies merely enable operations performed using another interface to be performed using the dialogue interface, and do not necessarily reduce operations performed by the user. For example, operations performed to input an application execution request in the form of a chat are not necessarily fewer than operations performed to input a command for executing the application.

Means for Solving the Problem

In order to solve the above problem and achieve an object, an operation assist system includes: a peripheral information acquisition unit configured to acquire at least any one of information relating to a first application that is running in a terminal, information relating to control of the terminal, and information that can be acquired from a sensor included in the terminal, as peripheral information; a peripheral information accumulation unit in which the peripheral information acquired by the peripheral information acquisition unit is accumulated; a dialogue interface unit configured to accept input of information from a user and output information to the user; and a scenario control unit configured to cause the dialogue interface unit to output information relating to execution of a second application that is associated with a predetermined condition in advance, when the peripheral information accumulated in the peripheral information accumulation unit and information input to the dialogue interface unit satisfy the predetermined condition.

Effects of the Invention

According to the present invention, it is possible to reduce user operations when controlling an application using a dialogue interface.

DESCRIPTION OF EMBODIMENTS

The following describes embodiments of an operation assist system, an operation assist method, and an operation assist program according to the present application in detail based on the drawings. Note that the present invention is not limited by the embodiments described below.

First Embodiment

Configuration of First Embodiment

Figure 1:
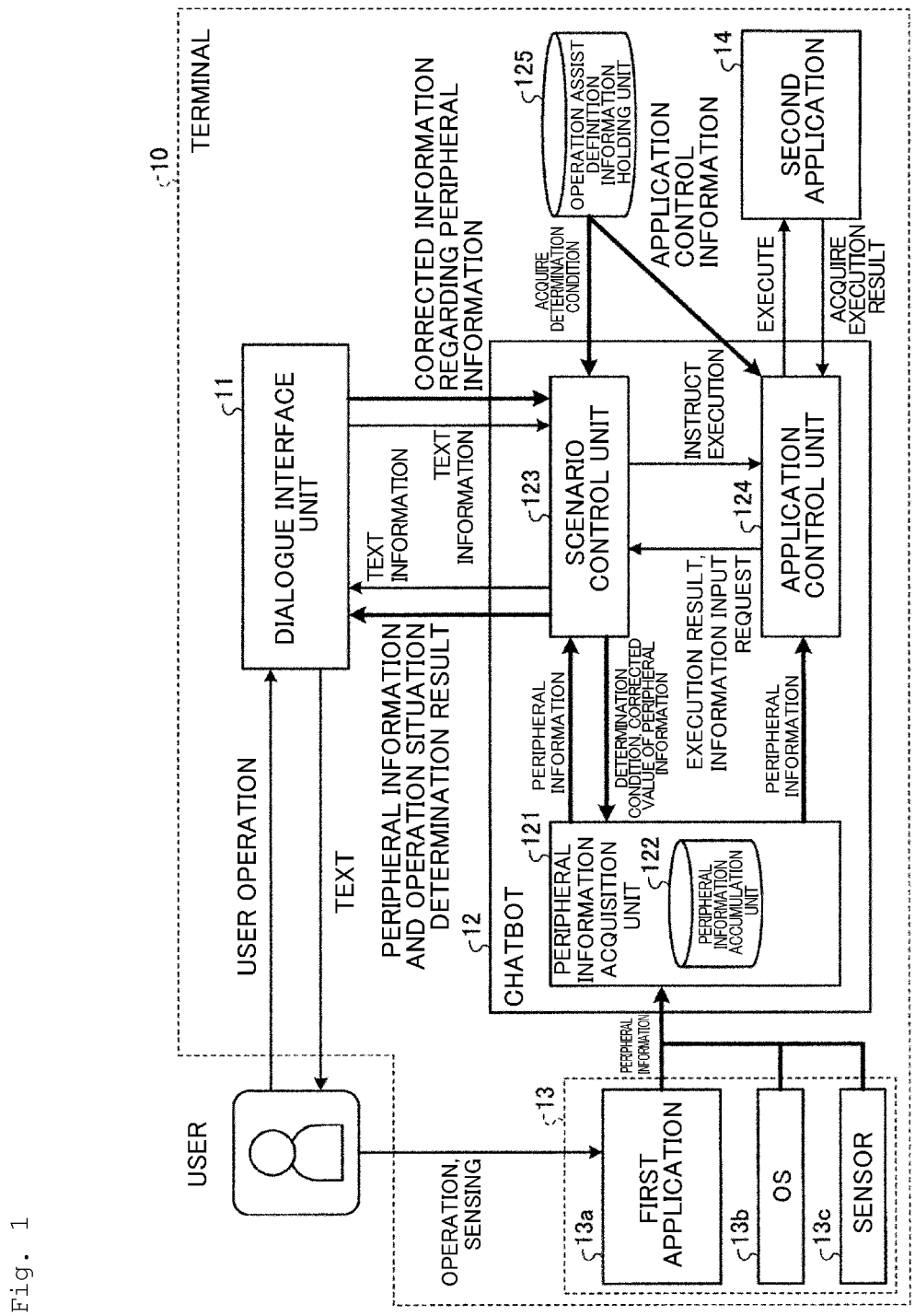
FIG. 1 is a diagram showing an example configuration of an operation assist system according to a first embodiment.

First, a configuration of an operation assist system according to a first embodiment will be described using FIG. 1. FIG. 1 is a diagram showing an example of the configuration of the operation assist system according to the first embodiment. In the present embodiment, the operation assist system is realized by a terminal 10 that is operated by a user.

As shown in FIG. 1, the terminal 10 includes a dialogue interface unit 11, a chatbot 12, a first application 13a, an OS (Operating System) 13b, a sensor 13c, and a second application 14. The chatbot 12 includes a peripheral information acquisition unit 121, a peripheral information accumulation unit 122, a scenario control unit 123, an application control unit 124, and an operation assist definition information holding unit 125. The operation assist definition information holding unit 125 may be provided outside the chatbot 12.

The dialogue interface unit 11 accepts input of information from a user and outputs information to the user. Here, the dialogue interface unit 11 displays a chat screen that includes an input field and an output field in a display of the terminal 10 or the like, for example. The dialogue interface unit 11 accepts input of text via an operation that is performed by the user on an input device such as a keyboard. The dialogue interface unit 11 may also accept input of voice from a microphone and convert the voice to text. Note that the input device referred to here includes not only a physical device but also a virtual keyboard or the like that is displayed in a touch panel display.

The chatbot 12 is a program that automatically responds to input text using text or the like. The chatbot 12 can also execute an application included in the terminal 10, following a request indicated by the input text.

The terminal 10 includes one or more applications as the first application(s) 13a. Each first application 13a executes processing according to a user operation or sensing performed by a predetermined sensor.

The terminal 10 includes one or more applications as the second application(s) 14. Each second application 14 executes processing according to control performed by the chatbot 12. Note that the second application(s) 14 may overlap with the first application(s) 13a, and can execute processing according to a user operation or sensing performed by a predetermined sensor, similarly to the first application(s).

Here, the peripheral information acquisition unit 121 of the chatbot 12 acquires at least any one of information relating to a first application 13a that is running in the terminal, information relating to control of the terminal, and information that can be acquired from a sensor included in the terminal, as peripheral information. The peripheral information includes operations performed by the user with respect to the first application 13a, information displayed by the first application 13a, and the like. Furthermore, the peripheral information may also include information relating to control of the terminal, which can be acquired from the OS 13b or the like, such as a date and time, a login name, information of applications running in the terminal, network connection information, and hardware information. Also, the peripheral information may also include acceleration, GPS information, and the like, which can be acquired from the sensor 13c included in the terminal 10. For example, whether or not a predetermined application is running is information that can be acquired from the OS, and is an example of information relating to control of the terminal. The peripheral information acquired by the peripheral information acquisition unit 121 is accumulated in the peripheral information accumulation unit 122.

When the peripheral information accumulated in the peripheral information accumulation unit 122 and information that is input to the dialogue interface unit 11 satisfy a predetermined condition, the scenario control unit 123 causes the dialogue interface unit 11 to output information that is associated with the condition in advance. The scenario control unit 123 identifies an application that is to be executed, by performing condition determination, and causes the dialogue interface unit 11 to output information relating to execution of the identified application.

For example, the scenario control unit 123 causes the dialogue interface unit 11 to display text information that indicates candidates for the application to be executed. Also, the scenario control unit 123 acquires text information input by the user from the dialogue interface unit 11, for example.

Also, the scenario control unit 123 acquires peripheral information from the peripheral information accumulation unit 122. Also, the scenario control unit 123 acquires, from the operation assist definition information holding unit 125, determination conditions that are conditions for determining the application to be executed. Also, the scenario control unit 123 can instruct the application control unit 124 to execute a second application 14 according to a condition determination result or input from the user to the dialogue interface unit 11. That is, even when the user does not perform an operation, the scenario control unit 123 can automatically instruct execution of the second application according to the condition determination result. Also, the scenario control unit 123 can acquire an execution result of the application from the application control unit 124.

In response to the instruction from the scenario control unit 123, the application control unit 124 executes the second application 14 using peripheral information accumulated in the peripheral information accumulation unit 122. Furthermore, the application control unit acquires an execution result of the second application 14 and passes the execution result on to the scenario control unit 123. Also, the application control unit 124 acquires, from the operation assist definition information holding unit 125, application control information that is information for executing the second application 14.

EXAMPLE 1-1

Figure 2:
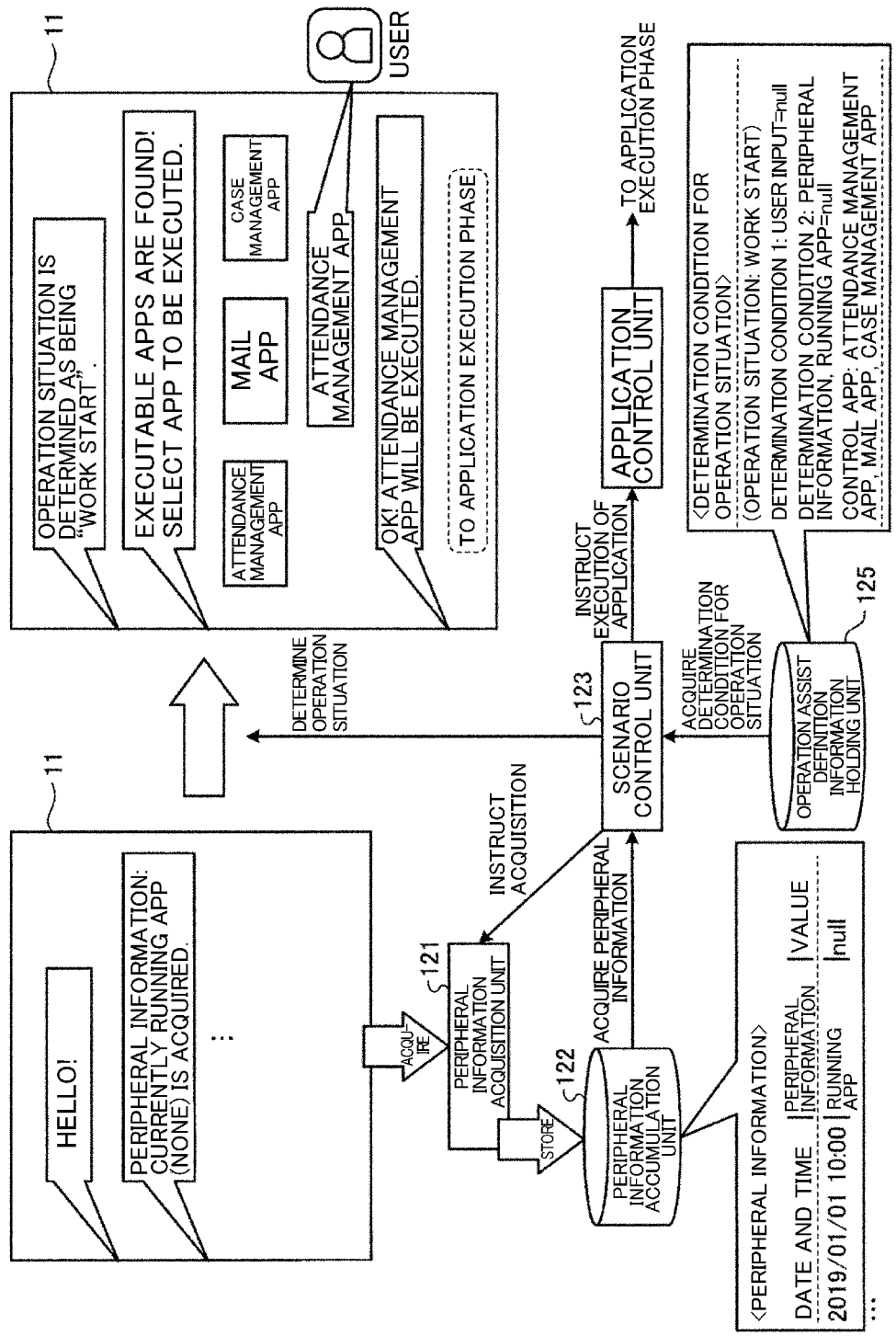
FIG. 2 is a diagram showing an application identification phase.

Here, processing that is performed by the operation assist system will be described using a specific example. First, an application identification phase for identifying an application to be executed will be described using FIG. 2. FIG. 2 is a diagram showing the application identification phase. First, the scenario control unit 123 acquires determination conditions for operation situations from the operation assist definition information holding unit 125, and instructs the peripheral information acquisition unit 121 to start to acquire peripheral information that needs to be acquired to determine the operation situations. In response to the instruction from the scenario control unit 123, the peripheral information acquisition unit 121 acquires peripheral information from the first application 13a and the like, and stores the acquired peripheral information in the peripheral information accumulation unit 122. Here, assume that no first application 13a is being executed. The peripheral information acquisition unit 121 can confirm whether or not a predetermined application is running, by referring to a task management function of the OS 13b or the like, for example.

In this case, the terminal 10 outputs the following message "peripheral information: currently running app (none) is acquired". Note that the message is output by the terminal 10 as a result of the scenario control unit 123 controlling the dialogue interface unit 11.

Here, as shown in FIG. 2, peripheral information accumulated in the peripheral information accumulation unit 122 includes items such as "date and time", "peripheral information", and "value". In the example shown in FIG. 2, it is indicated that "running app" of the peripheral information acquired at "2019/01/01 10:00" was "null". This means that no first application 13a was being executed at the time point at which the collected information was acquired.

Here, the scenario control unit 123 acquires the peripheral information from the peripheral information accumulation unit 122. Then, the scenario control unit 123 determines an operation situation of the terminal 10 based on the acquired information.

Here, assume that determination conditions for an operation situation "work start" are the following: "determination condition 1: user input=null, determination condition 2: peripheral information, running app=null, control app: attendance management app, mail app, case management app". The above conditions indicate that when there is no input from the user to the dialogue interface unit 11 and no first application 13a is being executed, the attendance management app, the mail app, and the case management app are presented as candidates.

The scenario control unit 123 determines that the operation situation is "work start" and causes the dialogue interface unit 11 to display the attendance management app, the mail app, and the case management app as candidates. At this time, the user selects an application that the user wants to be executed. Then, the scenario control unit 123 instructs the application control unit 124 to execute the application selected by the user. The user can select the application by inputting text, pressing a button, or inputting voice, for example. Note that pressing means an operation such as clicking performed with a mouse or tapping a touch panel.

The scenario control unit 123 determines response information that is to be given as a response to information input to the dialogue interface unit 11, based on both the input information and peripheral information acquired by the peripheral information acquisition unit 121, and causes the dialogue interface unit 11 to output the response information. In Example 1-1, the scenario control unit 123 narrows down applications to be executed based on the peripheral information, and identifies an application to be executed based on input from the user.

Figure 3:
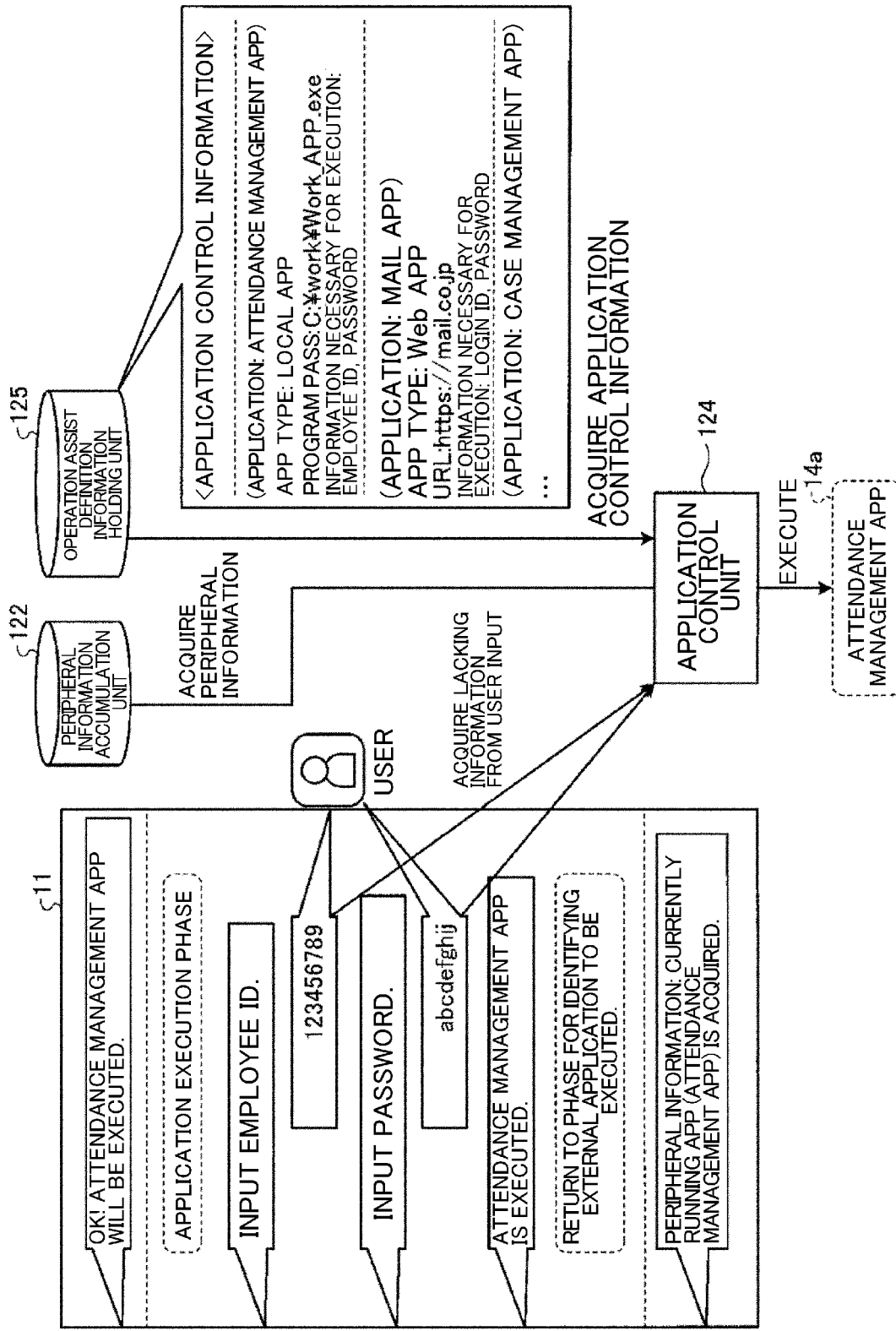
FIG. 3 is a diagram showing an application execution phase.

An application execution phase will be described using FIG. 3, assuming that the attendance management app is selected. FIG. 3 is a diagram showing the application execution phase. First, as shown in FIG. 3, the application control unit 124 refers to the operation assist definition information holding unit 125 and finds that information necessary to execute the attendance management app is "employee ID" and "password". At this time, the "employee ID" and the "password" have not been input by the user, and therefore, the terminal 10 displays a message that requests input of the "employee ID" and the "password" to supplement the information.

The application control unit 124 executes the attendance management app 14a using an employee ID "123456789" and a password "abcdefghij" that are input by the user. Note that the attendance management app 14a is one of the second applications 14.

As described above, in a case where peripheral information accumulated in the peripheral information accumulation unit 122 lacks information that is determined in advance as information necessary to execute the second application 14, the scenario control unit 123 causes the dialogue interface unit 11 to output information that prompts input of the lacking information. Also, the peripheral information acquisition unit 121 further acquires information that is input to the dialogue interface unit 11, as peripheral information. The information acquired as the peripheral information is used when the second application 14 is executed.

EXAMPLE 1-2

Figure 4:
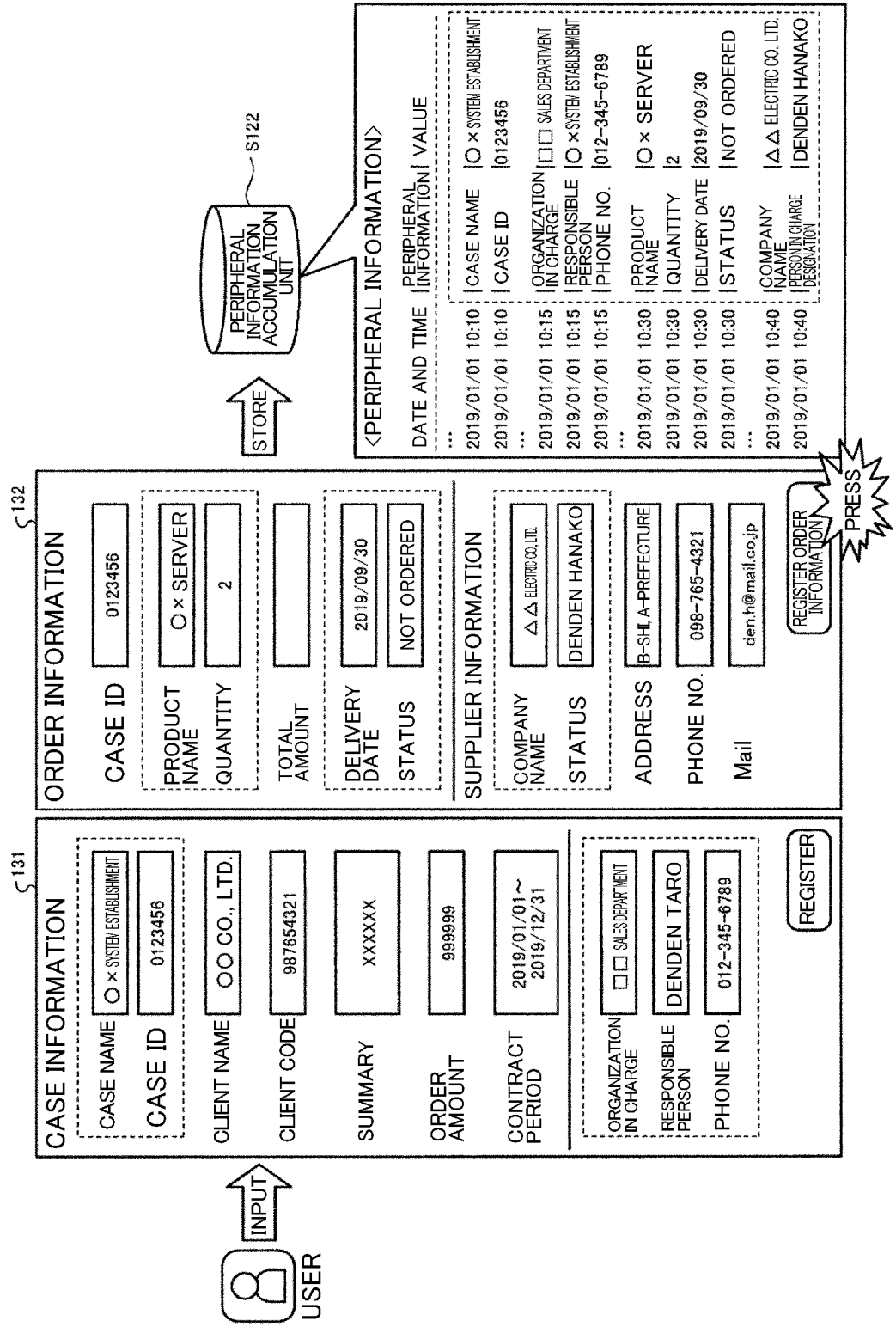
FIG. 4 is a diagram showing the application identification phase.

Another example will be described using FIGS. 4 and 5. FIG. 4 is a diagram showing the application identification phase. First, in response to an instruction from the scenario control unit 123, the peripheral information acquisition unit 121 acquires peripheral information from the first application 13a and the like, and stores the acquired peripheral information in the peripheral information accumulation unit 122. Here, the peripheral information acquisition unit 121 acquires, as the peripheral information, the fact that a case management app 131 and an order management app 132 are executed, and contents of input to these apps.

The peripheral information acquisition unit 121 acquires input contents of items that are specified in the application control information in the operation assist definition information holding unit 125. For example, the peripheral information acquisition unit 121 acquires, from the case management app 131, input contents of items such as "case name", "case ID", "organization in charge", "responsible person", and "phone No.". Also, the peripheral information acquisition unit 121 acquires, from the order management app 132, input contents of items such as "product name", "quantity", "delivery date", "status", "company name", and "status (of supplier information)". Then, the peripheral information acquisition unit 121 accumulates item names and input contents in the peripheral information accumulation unit 122.

Figure 5:
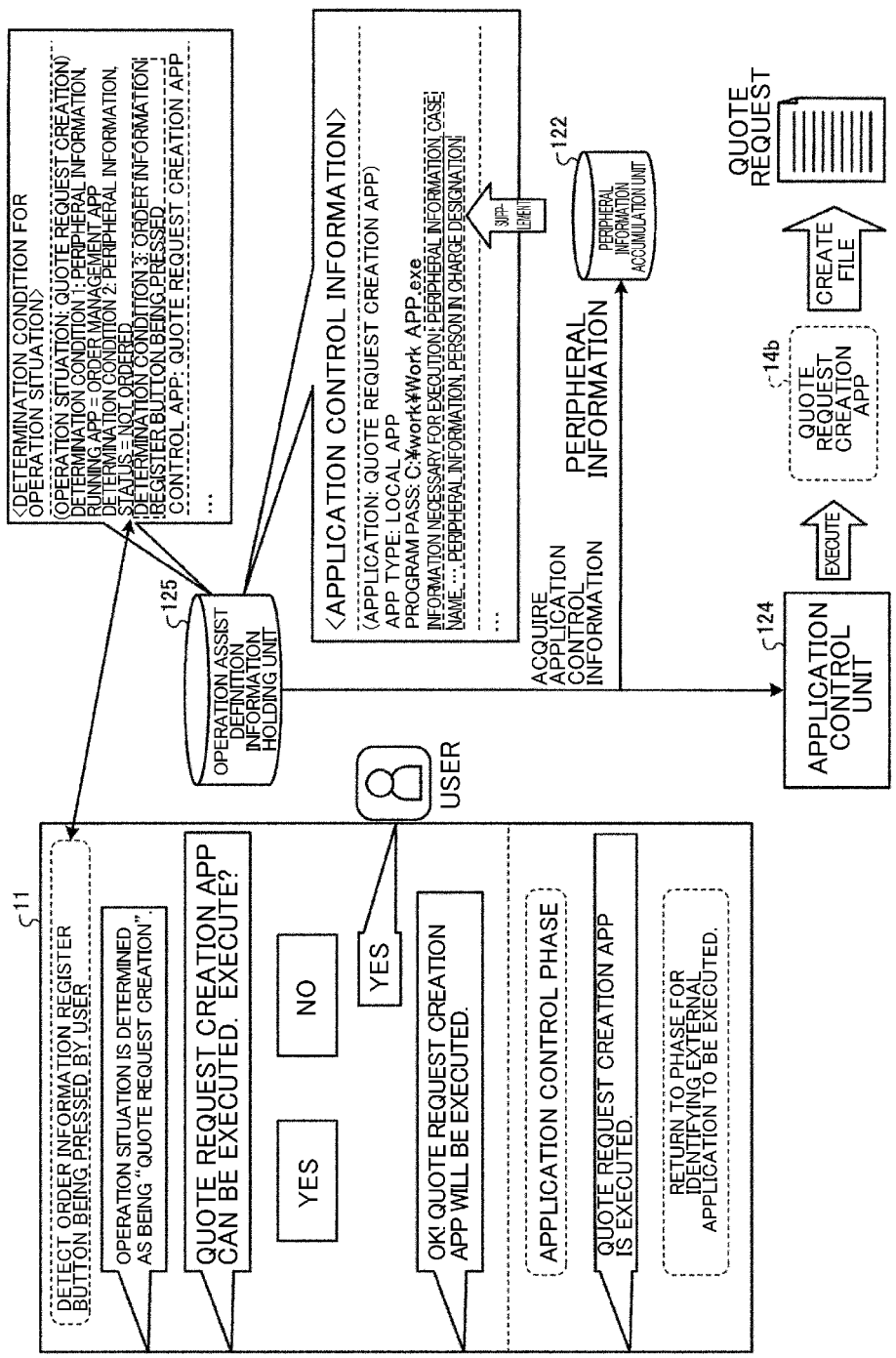
FIG. 5 is a diagram showing the application execution phase.

In this case, as shown in FIG. 5, upon detecting an order information register button of the order management app 132 being pressed, the terminal 10 outputs a message indicating that the operation situation is "quote request creation" and a message for confirming whether or not to execute a quote creation app.

Here, determination conditions for the operation situation "quote request creation" are the following: "determination condition 1: peripheral information, running app=order management app, determination condition 2: peripheral information, status=not ordered, determination condition 3: order information register button being pressed, control app: quote request creation app". The above conditions indicate that when the order information register button of the order management app 132 is pressed in a state where the status is "not ordered", the quote request creation app is executed.

When an operation for executing the quote request creation app is performed by the user, the application control unit 124 executes the quote request creation app 14b based on the peripheral information to create a file of a quote request. Processing executed by the quote request creation app 14b may be executed by RPA.

EXAMPLE 1-3

An example of a case where the sensor 13c is used will be described. The sensor 13c can sense information regarding the user operating the terminal 10. For example, the sensor 13c detects the line of sight of the user. At this time, the peripheral information acquisition unit 121 estimates a position in the screen of the terminal 10 that is seen by the user from a detection result of the sensor 13c, and acquires an estimation result as peripheral information.

Here, assume that an icon that corresponds to a second application 14 is disposed in the screen of the terminal 10. At this time, if the position seen by the user, which is indicated by the peripheral information, is included in an area in which the icon corresponding to the second application 14 is disposed, the scenario control unit 123 determines that a predetermined condition is satisfied.

Alternatively, the sensor 13c may also acquire biological information of the user. For example, the sensor 13c acquires the pulse and the body temperature of the user. When the pulse and the body temperature of the user exceed predetermined threshold values, the scenario control unit 123 determines that determination conditions are satisfied.

Processing of First Embodiment

Figure 6:
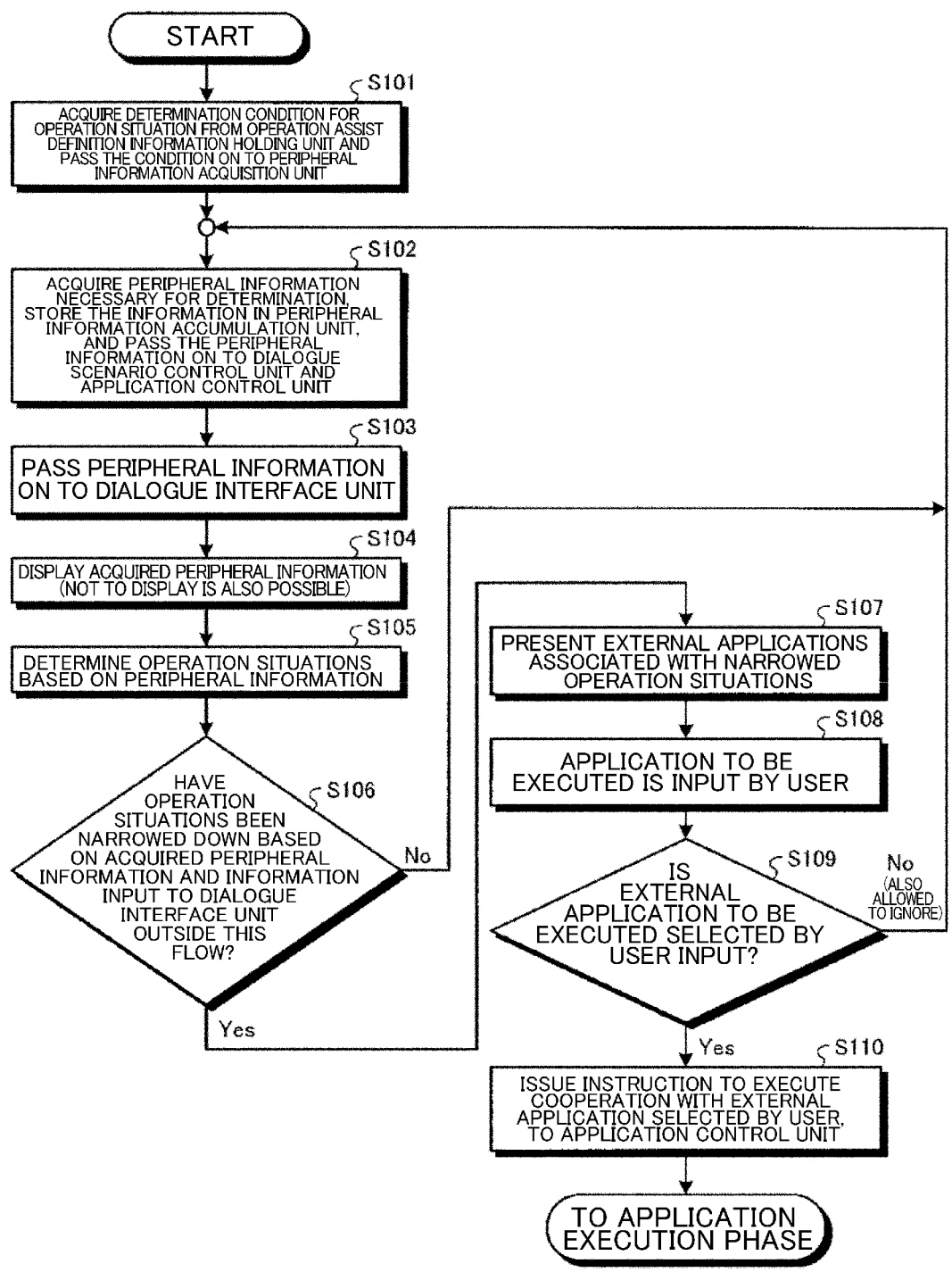
FIG. 6 is a flowchart showing a flow of processing performed in the application identification phase.

A flow of processing that is performed by the operation assist system will be described using FIGS. 6 and 7. First, processing performed in the application identification phase will be described using FIG. 6. FIG. 6 is a flowchart showing a flow of the processing performed in the application identification phase.

First, the terminal 10 acquires determination conditions for operation situations from the operation assist definition information holding unit 125, and passes the determination conditions on to the peripheral information acquisition unit 121 (step S101). Next, the terminal 10 acquires peripheral information necessary for the determination, stores the peripheral information in the peripheral information accumulation unit 122, and passes the peripheral information on to the scenario control unit 123 and the application control unit 124 (step S102).

Then, the terminal 10 passes the peripheral information on to the dialogue interface unit 11 (step S103). Also, the terminal 10 displays the acquired peripheral information (a configuration is also possible in which the peripheral information is not displayed) (step S104).

Here, the terminal 10 determines operation situations based on the peripheral information (step S105). If operation situations have not been narrowed down based on the acquired peripheral information and information input to the dialogue interface unit 11 outside this flow (No in step S106), the terminal 10 returns to step S102.

On the other hand, if operation situations have been narrowed down based on the acquired peripheral information and information input to the dialogue interface unit 11 outside this flow (Yes in step S106), the terminal 10 presents external applications (second applications 14) that are associated with the narrowed operation situations (step S107).

Here, the terminal 10 accepts input from the user as to which of the applications is to be executed (step S108). If an external application to be executed is not selected through input from the user (No in step S109), the terminal 10 returns to step S102. Also, if the user has performed another operation ignoring the presented applications, the terminal 10 determines "No" in step S109.

On the other hand, if an external application that is to be executed is selected through input from the user (Yes in step S109), the terminal 10 issues an instruction to execute cooperation with the external application selected by the user, to the application control unit 124 (step S110). Then, the terminal 10 proceeds to the application execution phase.

Figure 7:
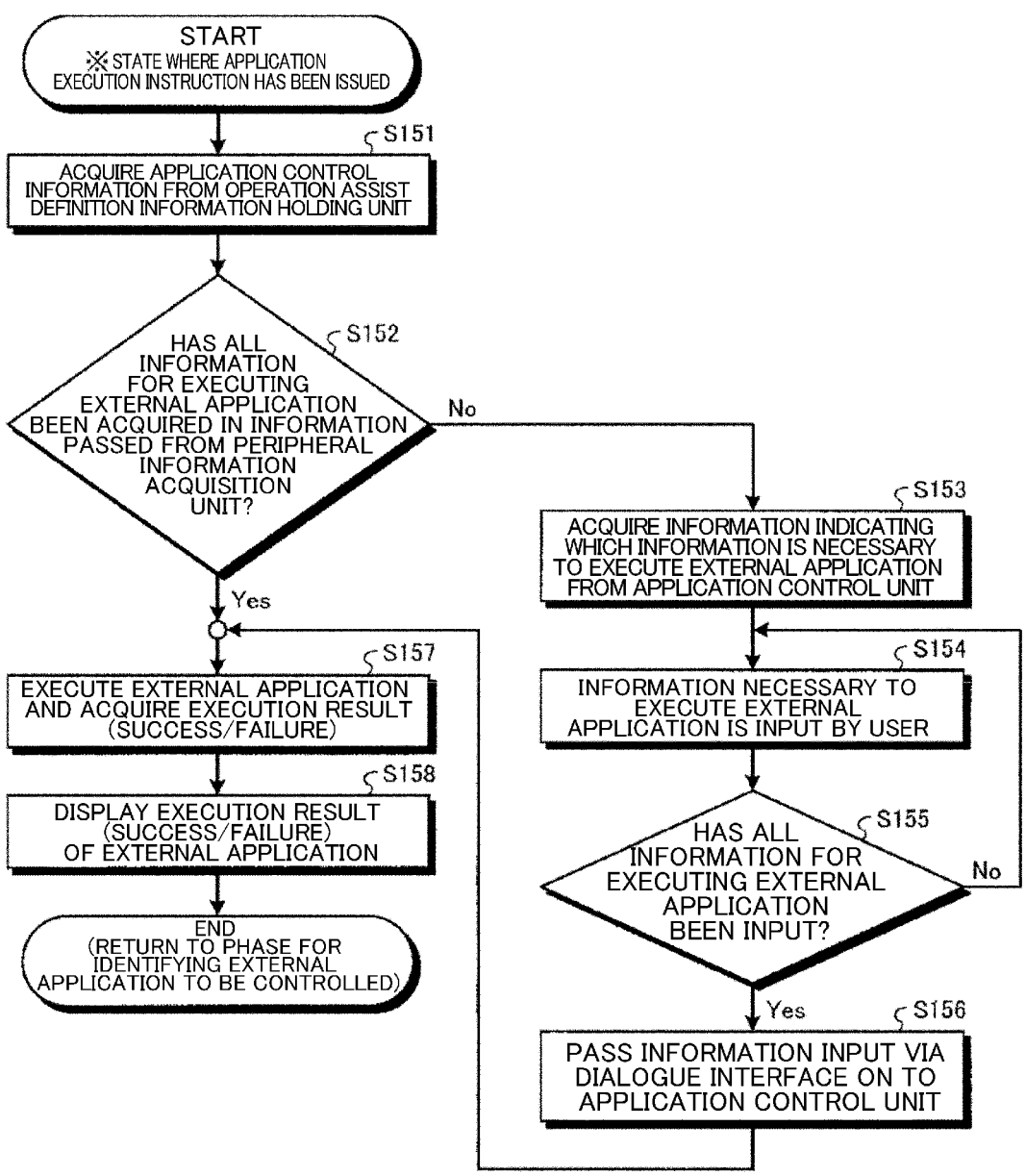
FIG. 7 is a flowchart showing a flow of processing performed in the application execution phase.

FIG. 7 is a flowchart showing a flow of processing performed in the application execution phase. As shown in FIG. 7, the terminal 10 first acquires application control information from the operation assist definition information holding unit 125 (step S151).

Here, if all information for executing the external application has not been acquired in information passed from the peripheral information acquisition unit 121 (No in step S152), the terminal 10 acquires, from the application control unit 124, information that indicates which information is necessary to execute the external application (step S153). Then, the terminal 10 accepts input of information necessary to execute the external application from the user (step S154) until all information for executing the external application is input (No in step S155).

When all information for executing the external application is input (Yes in step S155), the terminal 10 passes information that is input via the dialogue interface on to the application control unit 124 (step S156).

When it is determined in step S152 that all information for executing the external application has been acquired in information passed from the peripheral information acquisition unit 121 (Yes in step S152), or when step S156 is executed, the terminal 10 executes the external application and acquires an execution result (success/failure) (step S157). Then, the terminal 10 displays the execution result (success/failure) of the external application (step S158). After ending the processing of the application execution phase, the terminal 10 can return to the processing of the application identification phase.

Effects of First Embodiment

As described above, the peripheral information acquisition unit 121 acquires information relating to a first application 13a running in the terminal, information relating to control of the terminal, which can be acquired from the OS and the like, information that can be acquired from the sensor included in the terminal, or the like, as peripheral information. The peripheral information acquired by the peripheral information acquisition unit 121 is accumulated in the peripheral information accumulation unit 122. The dialogue interface unit 11 accepts input of information from the user and outputs information to the user. When the peripheral information accumulated in the peripheral information accumulation unit 122 and information input to the dialogue interface unit 11 satisfy a predetermined condition, the scenario control unit 123 causes the dialogue interface unit 11 to output information relating to execution of a second application 14 that is associated with the condition in advance. As described above, the operation assist system according to the present embodiment automatically identifies an application to be executed, based on the peripheral information. Therefore, the operation assist system reduces user operations.

In response to an instruction from the scenario control unit 123, the application control unit 124 executes the second application 14 using peripheral information accumulated in the peripheral information accumulation unit 122. Also, the scenario control unit 123 instructs the application control unit 124 to execute the second application 14 according to input from the user to the dialogue interface unit 11. As described above, the operation assist system can execute an application using the peripheral information. Therefore, the operation assist system reduces operations for inputting information necessary to execute the application.

In a case where the peripheral information accumulated in the peripheral information accumulation unit 122 lacks information that is determined in advance as information necessary to execute the second application 14, the scenario control unit 123 causes the dialogue interface unit 11 to output information that prompts input of the lacking information. Also, the peripheral information acquisition unit 121 further acquires information that is input to the dialogue interface unit 11, as peripheral information. Thus, the operation assist system can prompt the user to input information when information necessary for an application is absent.

The scenario control unit 123 determines response information that is to be given as a response to information input to the dialogue interface unit 11, based on both the input information and peripheral information acquired by the peripheral information acquisition unit 121, and causes the dialogue interface unit 11 to output the response information. Thus, the operation assist system executes an application based on both the peripheral information and input from the user. Therefore, the operation assist system can execute an appropriate application according to operation situations of the user and reduce operations performed by the user.

Second Embodiment

Configuration of Second Embodiment

The operation assist system may be configured to present and correct acquired peripheral information. An operation assist system according to a second embodiment includes a function for displaying peripheral information and a function for correcting the peripheral information in addition to the functions described in the first embodiment.

As shown in FIG. 1, the scenario control unit 123 provides peripheral information to the dialogue interface unit 11. Furthermore, the scenario control unit 123 acquires correction information indicated by the user from the dialogue interface unit 11. Also, the peripheral information acquisition unit 121 acquires the correction information regarding peripheral information from the scenario control unit 123.

For example, a case is conceivable in which, when inputting information regarding orders, the user wants to input information regarding an order that differs from an order for which peripheral information has already been acquired, and wants to correct the peripheral information. Also, it is conceivable that in a state where a plurality of windows are open for respective orders, if an operation situation is determined based on peripheral information acquired from a window that differs from a window intended by the user, the user wants to correct the peripheral information. Furthermore, a case is conceivable in which peripheral information is corrected to information regarding a past order in order to execute cooperation processing again for the past order for which the cooperation processing has not been executed.

EXAMPLE 2-1

Here, processing for correcting peripheral information will be described giving a specific example using FIG. 8. First, similarly to Example 2-1 described above, the terminal 10 determines that the operation situation is "quote request creation", and outputs a message for confirming whether or not to execute the quote request creation app. At this time, if the user performs an operation indicating that the user wants correction, the terminal 10 displays candidates for an item to be corrected.

Figure 8:
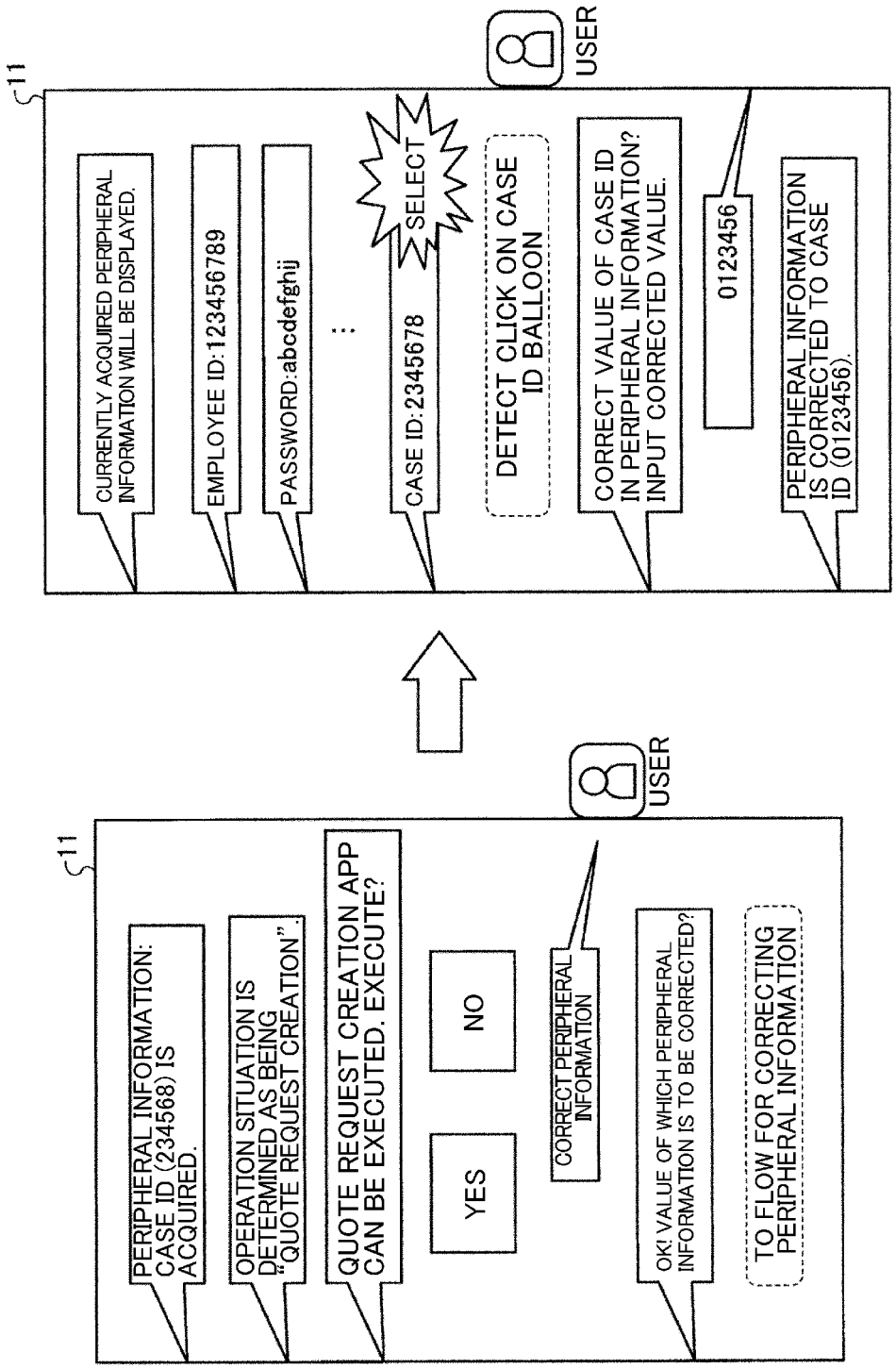
FIG. 8 is a diagram showing processing for correcting peripheral information.

In the example shown in FIG. 8, the terminal 10 starts processing for correcting peripheral information in response to a message "correct peripheral information" being input by the user. Here, the terminal 10 displays candidates for peripheral information that can be corrected, such as "employee ID", "password", and "case ID". Then, the user presses a position at which an item that the user wants to correct is displayed.

Assume that the user specifies "case ID" in the example shown in FIG. 8. At this time, the terminal 10 displays a message that prompts input of a corrected value for the "case ID" specified by the user. Then, when the corrected value is input by the user, the terminal 10 corrects peripheral information, and displays a message indicating completion of the input correction and the corrected value.

Figure 9:
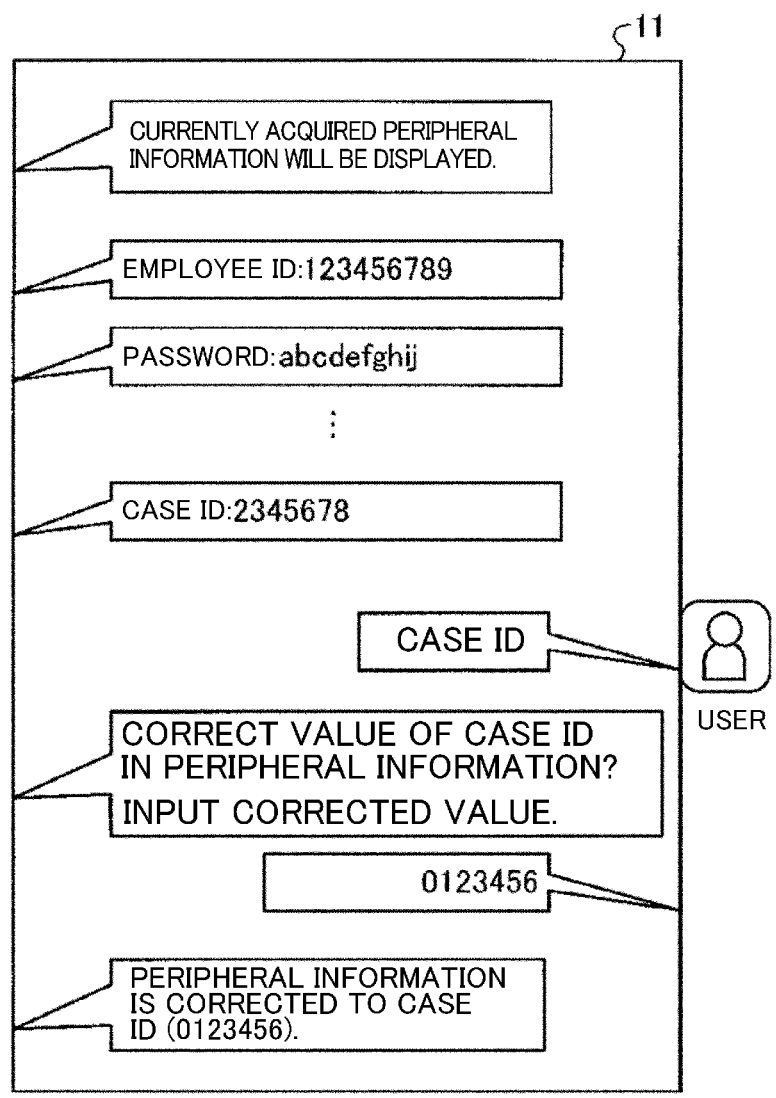
FIG. 9 is a diagram showing another method for specifying an item to be corrected.

In the example shown in FIG. 8, the user specifies the item to be corrected by pressing the position at which "case ID" is displayed. On the other hand, as shown in FIG. 9, text may be input to specify the item to be corrected. In the example shown in FIG. 9, the user specifies the item to be corrected by inputting the text "case ID".

EXAMPLE 2-2

In a case where an application is executed in a plurality of windows, for example, peripheral information that was acquired and accumulated with respect to a previously opened window may be overwritten as a result of the peripheral information acquisition unit 121 acquiring peripheral information from a window that is opened later. In such a case, the terminal 10 can perform processing for restoring the peripheral information in response to a user operation.

Figure 10:
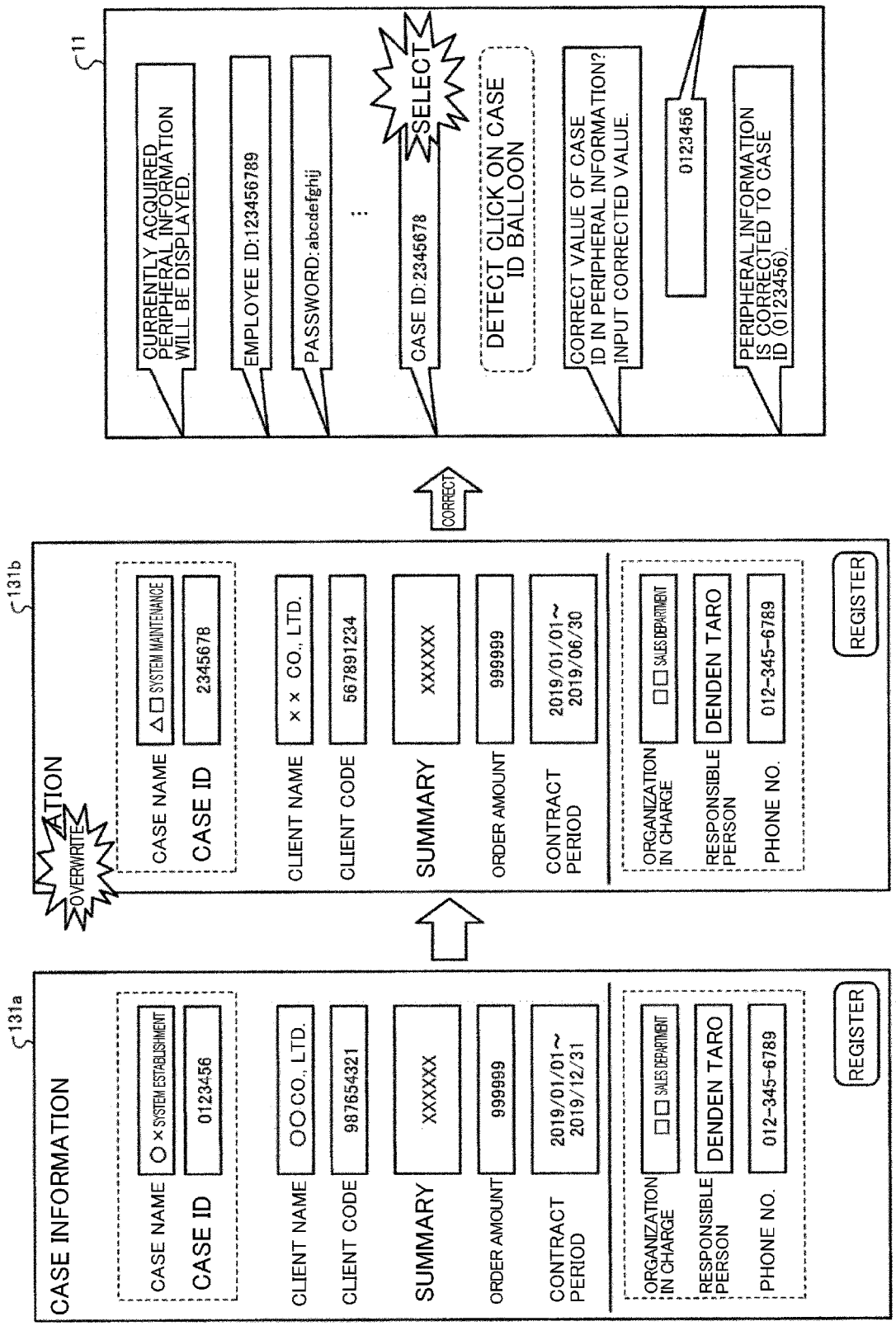
FIG. 10 is a diagram showing processing for restoring peripheral information.

FIG. 10 is a diagram showing the processing for restoring peripheral information. Assume that, as shown in FIG. 10, after inputting case information of a case that has a case ID of "0123456", the user opened another window and input case information of a case that has a case ID of "2345678". Also, assume that in a case where the same application is executed in a plurality of windows, the peripheral information acquisition unit 121 acquires, as peripheral information, input contents regarding a window for which input was performed last.

Here, the terminal 10 first displays case information of the case having the case ID of "2345678", as currently acquired peripheral information. Upon detecting the displayed case ID being pressed by the user, the terminal 10 displays a message that prompts input of a corrected value for the "case ID". Then, when the corrected value is input by the user, the terminal 10 corrects the peripheral information, and displays a message indicating completion of the input correction and the corrected value.

In a case where key information such as the "case ID" is corrected, the terminal 10 may also correct case information associated with the key information at the same time. For example, in the example shown in FIG. 10, the terminal 10 can correct "case name" associated with the "case ID" at the same time. In this case, the terminal 10 executes the quote request creation app 14b using the corrected "case ID" and "case name".

Processing of Second Embodiment

Figure 11:
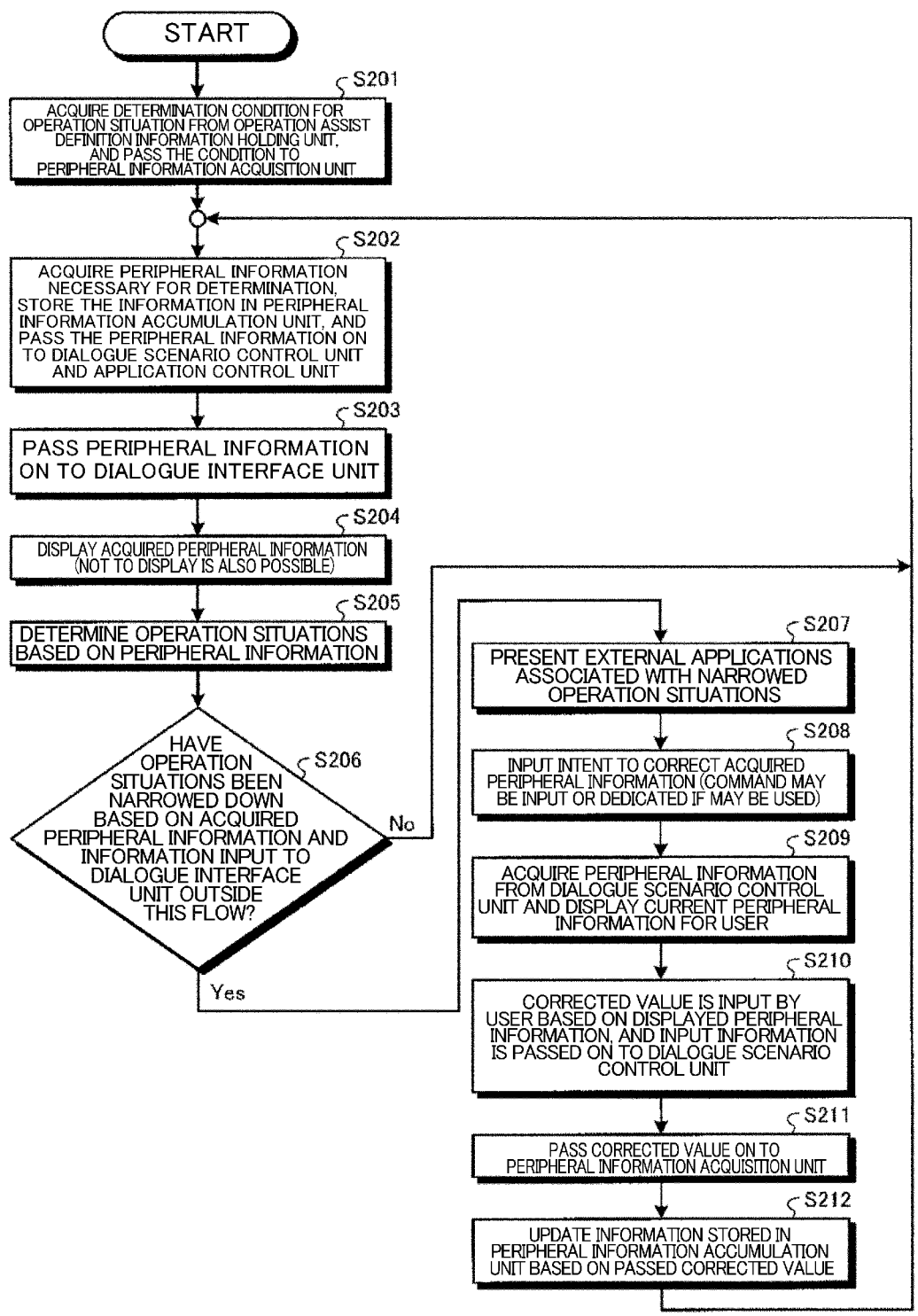
FIG. 11 is a flowchart showing a flow of processing performed by an operation assist system according to a second embodiment.

A flow of the processing for correcting peripheral information will be described using FIG. 11. FIG. 11 is a flowchart showing a flow of processing performed by the operation assist system according to the second embodiment. First, the terminal 10 acquires determination conditions for operation situations from the operation assist definition information holding unit 125, and passes the determination conditions on to the peripheral information acquisition unit 121 (step S201). Next, the terminal 10 acquires peripheral information necessary for the determination, stores the peripheral information in the peripheral information accumulation unit 122, and passes the peripheral information on to the scenario control unit 123 and the application control unit 124 (step S202).

Then, the terminal 10 passes the peripheral information on to the dialogue interface unit 11 (step S203). Also, the terminal 10 displays the acquired peripheral information (a configuration is also possible in which the peripheral information is not displayed) (step S204).

Here, the terminal 10 determines operation situations based on the peripheral information (step S205). If operation situations have not been narrowed down based on the acquired peripheral information and information input to the dialogue interface unit 11 outside this flow (No in step S206), the terminal 10 returns to step S202.

On the other hand, if operation situations have been narrowed down based on the acquired peripheral information and information input to the dialogue interface unit 11 outside this flow (Yes in step S206), the terminal 10 presents external applications (second applications 14) that are associated with the narrowed operation situations (step S207).

Here, input indicating that the user wants to correct the acquired peripheral information is accepted from the user (step S208). As described above, the user may press the item to be corrected or input the item in text. Alternatively, the terminal 10 may accept input of a correction command or prepare a dedicated interface for correction such as a button.

The terminal 10 acquires peripheral information from the scenario control unit 123 and displays the current peripheral information for the user (step S209). Then, the terminal 10 passes a corrected value that is input by the user based on the displayed peripheral information on to the scenario control unit 123, as input information (step S210).

Furthermore, the terminal 10 passes the corrected value on to the peripheral information acquisition unit 121 (step S211). Then, the terminal 10 updates peripheral information accumulated in the peripheral information accumulation unit 122 based on the corrected value (step S212).

Effects of Second Embodiment

As described above, the scenario control unit 123 causes the dialogue interface unit 11 to output peripheral information acquired by the peripheral information acquisition unit 121. As a result, the user can check the peripheral information and determine whether or not the peripheral information needs to be corrected.

Also, when an operation for correcting the peripheral information output by the dialogue interface unit 11 is performed by the user, the scenario control unit 123 corrects the peripheral information based on the user operation. Thus, the user can correct the peripheral information as necessary.

Other Embodiments

Some functions of the operation assist system may be realized by a server or the like. For example, a configuration is also possible in which, in the operation assist system, the dialogue interface unit 11, the first application 13a, and the second application 14 are included in the terminal, and the chatbot 12 is included in a server.

Also, the dialogue interface unit 11 may be a known external tool such as slack (registered trademark). In this case, the scenario control unit 123 cooperates with the external tool by passing information on to the external tool using an API (Application Programming Interface) or the like.

Also, particularly in a case where the first application is a Web application, the peripheral information acquisition unit 121 may be replaced with a UI extension function described in Reference Document 1 (JP 2017-72872A (Japanese Patent No. 6514084)). That is, the terminal 10 displays an extension component so as to be overlaid on a predetermined input item, and acquires a value that is input to the extension component as peripheral information. In this case, a portion of the processing performed in step S102 shown in FIG. 6 is replaced with an information acquisition unit and an input detection unit described in Reference Document 1. Also, at this time, the acquired peripheral information may be stored in a web storage of a web browser or a local file so that the web storage or the local file functions as the peripheral information accumulation unit 122.

In this case, the operation assist system includes, for example: an information acquisition unit that acquires GUI component specifying information that indicates a displayed position and a displayed size of a GUI component that constitutes a first application running in a terminal; an extension component output generation unit that generates an extension component of the GUI component based on the acquired GUI component specifying information regarding the GUI component; an extension component display unit that displays the generated extension component so as to be overlaid on the GUI component in a screen; an input detection unit that detects input to the extension component; a peripheral information acquisition unit that acquires content of the input detected by the input detection unit as peripheral information; a peripheral information accumulation unit in which the peripheral information acquired by the peripheral information acquisition unit is accumulated; a dialogue interface unit that accepts input of information from a user and outputs information to the user; and a scenario control unit that causes the dialogue interface unit to output information relating to execution of a second application that is associated with a predetermined condition in advance, when the peripheral information accumulated in the peripheral information accumulation unit and information input to the dialogue interface unit satisfy the predetermined condition.

The scenario control unit 123 may perform determination based on peripheral information that is a combination of two or more types of information out of information relating to the first application 13a, information relating to control of the terminal, and information that can be acquired from a sensor included in the terminal. For example, the peripheral information acquisition unit 121 acquires, from the OS 13b, information indicating whether or not the second application 14 is running, and acquires, from the sensor 13c, a position in the screen of the terminal 10 that is seen by the user. If the second application 14 is not running and the position seen by the user is included in an area in which an icon of the second application 14 is disposed, the scenario control unit 123 determines that the predetermined condition is satisfied.

System Configuration

The constitutional elements of the illustrated device represent functional concepts, and the device does not necessarily have to be physically configured as illustrated. That is, specific manners of distribution and integration of the portions of the device are not limited to those illustrated, and all or some portions of the device may be functionally or physically distributed or integrated in suitable units according to various types of loads or conditions in which the device is used. Also, all or some portions of each processing function executed in the device may be realized using a CPU and a program that is analyzed and executed by the CPU, or realized as hardware using a wired logic.

Also, out of the pieces of processing described in the present embodiment, all or some steps of a piece of processing that is described as being automatically executed may also be manually executed. Alternatively, all or some steps of a piece of processing that is described as being manually executed may also be automatically executed using a known method. The processing procedures, control procedures, specific names, and information including various types of data and parameters that are described above and shown in the drawings may be changed as appropriate unless otherwise stated.

Program

In one embodiment, the terminal 10 can be implemented by installing an operation assist program for executing the above-described operation assist processing as packaged software or online software on a desired computer. For example, it is possible to cause an information processing device to function as the terminal 10 by causing the information processing device to execute the operation assist program. The information processing device referred to here encompasses a desktop or notebook personal computer. The information processing device also encompasses mobile communication terminals such as a smartphone, a mobile phone, and a PHS (Personal Handyphone System), and slate terminals such as a PDA (Personal Digital Assistant).

Figure 12:
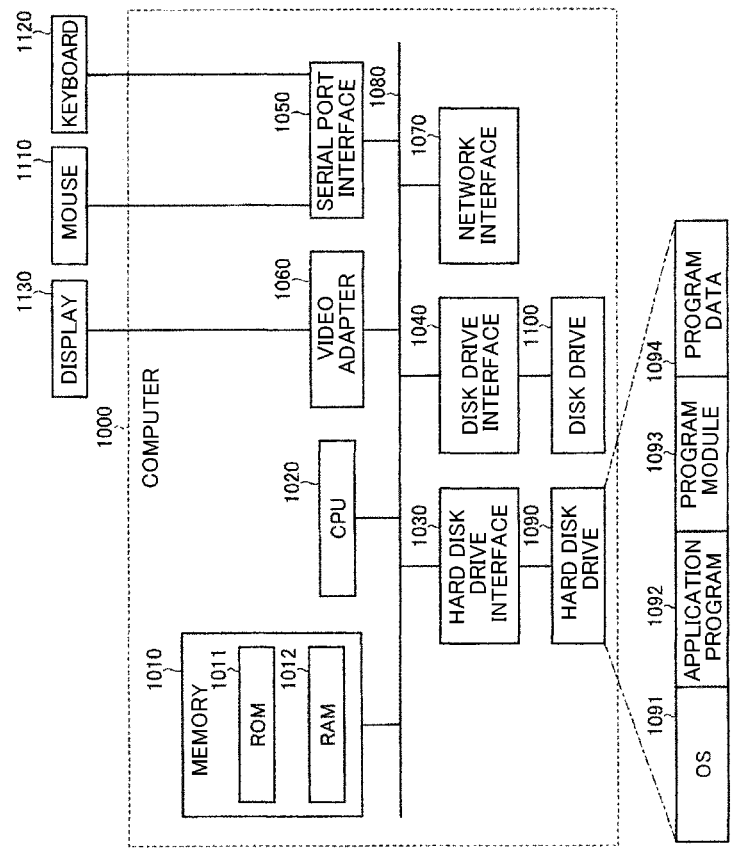
FIG. 12 is a diagram showing an example of a computer that executes an operation assist program.

FIG. 12 is a diagram showing an example of a computer that executes the operation assist program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These units are connected via a bus 1080.

The memory 1010 includes a ROM (Read Only Memory) 1011 and a RAM 1012. A boot program such as BIOS (BASIC Input Output System) is stored in the ROM 1011, for example. The hard disk drive interface 1030 is connected to a hard disk drive 1090. The disk drive interface 1040 is connected to a disk drive 1100. An attachable and detachable storage medium such as a magnetic disk or an optical disk is inserted into the disk drive 1100, for example. The serial port interface 1050 is connected to a mouse 1110 and a keyboard 1120, for example. The video adapter 1060 is connected to a display 1130, for example.

An OS 1091, an application program 1092, a program module 1093, and program data 1094 are stored in the hard disk drive 1090, for example. That is, a program that defines processing performed by the terminal 10 is implemented as the program module 1093 in which codes that can be executed by the computer are written. The program module 1093 is stored in the hard disk drive 1090, for example. For example, the program module 1093 for executing processing similar to the functional configuration of the terminal 10 is stored in the hard disk drive 1090. Note that the hard disk drive 1090 may be replaced with an SSD.

Setting data that is used in the processing performed in the above-described embodiments is stored as the program data 1094 in the memory 1010 or the hard disk drive 1090, for example. The CPU 1020 reads out the program module 1093 and the program data 1094 stored in the memory 1010 or the hard disk drive 1090 into the RAM 1012 as necessary and executes the processing in the above-described embodiments.

Note that the program module 1093 and the program data 1094 do not necessarily have to be stored in the hard disk drive 1090, and may also be stored in an attachable and detachable storage medium and read out by the CPU 1020 via the disk drive 1100 or the like, for example. Alternatively, the program module 1093 and the program data 1094 may also be stored in another computer that is connected via a network (LAN (Local Area Network), WAN (Wide Area Network), etc.). The program module 1093 and the program data 1094 may also be read out from the other computer by the CPU 1020 via the network interface 1070.

REFERENCE SIGNS LIST

10 Terminal
11 Dialogue interface unit
12 Chatbot
13*a* First application
13*b* OS
13*c* Sensor
14 Second application
121 Peripheral information acquisition unit
122 Peripheral information accumulation unit
123 Scenario control unit
124 Application control unit
125 Operation assist definition information holding unit

The invention claimed is:

1. An operation assist system comprising:
a peripheral information acquisition unit, including one or more processors, configured to acquire at least any one of information relating to a first application that is running in a terminal, information relating to control of the terminal, and information that can be acquired from a sensor included in the terminal, as peripheral information;
a peripheral information accumulation unit, including one or more processors, in which the peripheral information acquired by the peripheral information acquisition unit is accumulated;
a dialogue interface unit, including one or more processors, configured to accept input of information from a user and output information to the user; and
a scenario control unit, including one or more processors, configured to cause the dialogue interface unit to output information relating to execution of a second application that is associated with a predetermined condition in advance, when the peripheral information accumulated in the peripheral information accumulation unit and information input to the dialogue interface unit satisfy the predetermined condition;
wherein the scenario control unit is configured to cause the dialogue interface unit to output the peripheral information acquired by the peripheral information acquisition unit,
wherein when an operation for correcting the peripheral information output by the dialogue interface unit is performed by the user, the scenario control unit is configured to correct the peripheral information based on the operation performed by the user.

2. The operation assist system according to claim 1, further comprising an application control unit, including one or more processors, configured to execute the second application in response to an instruction from the scenario control unit by using the peripheral information accumulated in the peripheral information accumulation unit, wherein the scenario control unit is configured to instruct the application control unit to execute the second application according to the peripheral information accumulated in the peripheral information accumulation unit and input from the user to the dialogue interface unit.

3. The operation assist system according to claim 2, wherein when the peripheral information accumulated in the peripheral information accumulation unit lacks information that is determined in advance as information necessary to execute the second application, the scenario control unit is configured to cause the dialogue interface unit to output information that prompts input of the lacking information, and the peripheral information acquisition unit is configured to further acquire information input to the dialogue interface unit as peripheral information.

4. The operation assist system according to claim 3, wherein the scenario control unit is configured to determine response information to be given as a response to information that is input to the dialogue interface unit, based on both the input information and the peripheral information acquired by the peripheral information acquisition unit, and causes the dialogue interface unit to output the response information.

5. An operation assist method to be executed by a computer, the method comprising:
   acquiring at least any one of information relating to a first application that is running in a terminal, information relating to control of the terminal, and information that can be acquired from a sensor included in the terminal, as peripheral information;
   accumulating the acquired peripheral information;
   causing a dialogue interface unit to output information relating to execution of a second application that is associated with a predetermined condition in advance, when the accumulated peripheral information and information that is input to the dialogue interface unit satisfy the predetermined condition;
   accepting input of information from a user;
   outputting information to the user;
   causing the dialogue interface unit to output the peripheral information; and
   when an operation for correcting the output peripheral information is performed by the user, correcting the peripheral information based on the operation performed by the user.

6. A non-transitory computer readable medium storing one or more instructions causing a compute to execute:
   acquiring at least any one of information relating to a first application that is running in a terminal, information relating to control of the terminal, and information that can be acquired from a sensor included in the terminal, as peripheral information;
   accumulating the acquired peripheral information;
   causing a dialogue interface unit to output information relating to execution of a second application that is associated with a predetermined condition in advance, when the accumulated peripheral information and information that is input to the dialogue interface unit satisfy the predetermined condition;
   accepting input of information from a user;
   outputting information to the user;
   causing the dialogue interface unit to output the peripheral information; and
   when an operation for correcting the output peripheral information is performed by the user, correcting the peripheral information based on the operation performed by the user.

7. The operation assist method according to claim 5, further comprising: executing the second application in response to an instruction from a scenario control unit by using the peripheral information accumulated in the peripheral information accumulation unit, wherein instructing an application control unit to execute the second application according to the peripheral information accumulated in the peripheral information accumulation unit and input from a user to the dialogue interface unit.

8. The operation assist method according to claim 7, further comprising: when the peripheral information accumulated in the peripheral information accumulation unit lacks information that is determined in advance as information necessary to execute the second application, causing the dialogue interface unit to output information that prompts input of the lacking information, and acquiring information input to the dialogue interface unit as peripheral information.

9. The operation assist method according to claim 8, further comprising: determining response information to be given as a response to information that is input to the dialogue interface unit, based on both the input information and the peripheral information acquired by a peripheral information acquisition unit, and causes the dialogue interface unit to output the response information.

10. The non-transitory computer readable medium according to claim 6, further comprising: executing the second application in response to an instruction from a scenario control unit by using the peripheral information accumulated in the peripheral information accumulation unit, wherein instructing an application control unit to execute the second application according to the peripheral information accumulated in the peripheral information accumulation unit and input from a user to the dialogue interface unit.

11. The non-transitory computer readable medium according to claim 10, further comprising: when the peripheral information accumulated in the peripheral information accumulation unit lacks information that is determined in advance as information necessary to execute the second application, causing the dialogue interface unit to output information that prompts input of the lacking information, and acquiring information input to the dialogue interface unit as peripheral information.

12. The non-transitory computer readable medium according to claim 11, further comprising: determining response information to be given as a response to information that is input to the dialogue interface unit, based on both the input information and the peripheral information acquired by a peripheral information acquisition unit, and causes the dialogue interface unit to output the response information.

* * * * *